Patented Jan. 4, 1944

2,338,627

UNITED STATES PATENT OFFICE 2,338,627

SYMMETRICAL ARYL DISUBSTITUTED ALKYLOL GUANIDINE

Walter P. Ericks, Stamford, and James H. Williams, Riverside, Conn., assignors to American Cyanamid Company, New York, N. Y., a corporation of Maine No Drawing. Application September 5, 1942, Serial No. 457,482

2 Claims. (Cl. 260—565)

This invention relates to the preparation of new and useful condensation products of alkylene oxides and symmetrical disubstituted guanidines. More particularly, it embraces the preparation of condensation products obtained when alkylene oxides are reacted with guanidines having the general formula:

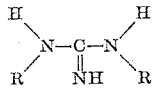

wherein both R's represent identical organic radicals which may be alkyl, aryl, aralkyl, alicyclic or heterocyclic radicals. Among the alkylene oxides which may be used herein are ethylene oxide, 1,2-propylene oxide, 1,3-propylene oxide, glycidol, glucosan, sugar anhydrides containing an ethylene oxide ring or compounds capable of yielding an intermediate containing an alkylene oxide ring in the course of the reaction, such as ethylene chlorohydrin, chloroglycerol, epichlorhydrin, and the like.

In particular, this case, being a continuation-in-part of the application bearing Serial No. 376,619, filed January 30, 1941, by Walter P. Ericks et al. issued October 13, 1942, as U. S. Patent 2,299,012 for "Symmetrical disubstituted alkylol guanidines" relates more particularly to the symmetrically disubstituted aryl guanidines.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents, as well as for the resolution of emulsions such as petroleum-water emulsions. They also find use as mercerizing assistants. Among the compounds herein described, those containing aryl and heterocyclic substituents have the valuable faculty or inducing local anaesthesia when applied topically or injected subcutaneously. They also display effective vaso-constrictor properties and when used as such only a very small amount of the heterocyclic product is necessary. Further and more important uses are suggested in the following description.

With these objects in view and such others as may hereinafter appear, the invention consists in the novel products and processes described below and more particularly defined in the claims.

The compounds of this invention are prepared in general by reacting a symmetrical substituted guanidine with a compound containing an ethylene oxide ring. If desired the reaction may be accelerated by using a temperature of 150° to 200° C. and a suitable organic or inorganic base, preferably an alkali-metal or alkaline earth metal hydroxide such as sodium hydroxide, potassium hydroxide, calcium hydroxide, a pyridine and the like. Usually the reaction is exothermic and hence must be controlled as by the use of an efficient cooling device. The reaction product is then filtered, evaporated, and if necessary, further purified by solvent extraction. Instead of a compound containing an alkylene oxide ring, an epihalogenhydrin may be used, or a similar substance having a radical which under the conditions of the reaction forms an intermediate having an alkylene oxide ring.

The following examples illustrate the invention in still further detail:

EXAMPLE I

*Preparation of 1,3-di-o-tolyl-2-ethylol guanidine*

51.2 g. of di-o-tolyl thiourea, 468 g. of basic lead carbonate, 13.5 g. of monoethanolamine and 700 ml. of absolute ethyl alcohol were stirred at 45° C. for 1½ hours. Testing for di-o-tolyl thiourea in the reaction mixture proved negative. The mixture was filtered and the filtrate was evaporated under reduced pressure. The residue was dissolved in ether and washed with water, dried with anhydrous calcium sulfate and the base was converted into the hydrochloride by passing dry HCl through the solution. A sticky precipitate which formed at first was disintegrated forming small discrete particles upon being stirred. 40 g. of the product having a melting point of 124°–130° C. was obtained.

The reaction is probably as follows:

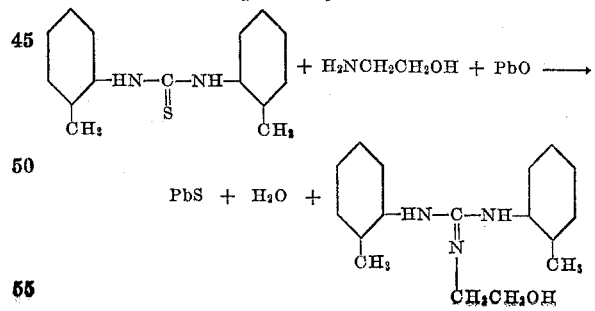

Recrystallization of half of the above sample from an alcohol-ether solution yielded a more purified product having a melting point of 124°–127° C. Two analyses were performed giving the following results:

|  | Per cent C | Per cent H | Per cent N |
|---|---|---|---|
|  | 64.19 | 6.95 | 12.98 |
|  | 64.10 | 6.87 | 13.21 |
| Calculated for $C_{17}H_{22}ON_3Cl$ | 63.85 | 6.89 | 13.16 |

$$\text{C}_6\text{H}_4(\text{CH}_3)\text{-HN-C(=N-CH}_2\text{CH}_2\text{OH)-NH-C}_6\text{H}_4(\text{CH}_3) \cdot \text{HCl}$$

Example II 12.0 g. of 1,3-di-o-tolyl guanidine and 14.8 g. of glycidol were stirred and heated to 150° C. in a beaker on a hot plate. At this temperature an exothermic reaction occurred and the temperature was held at 150° to 160° C. for 15 minutes by cooling the reaction mixture on a water bath. Further cooling yielded the desired product as a pale yellow, pliable, transparent resin which was insoluble in cold water and only sparingly soluble in hot water.

These condensation products obtained by reacting a compound containing an ethylene oxide ring and a symmetrical disubstituted guanidine are of particular utility as surface-active agents of the cation-active type. For this reason they are well suited for wetting and softening wool, cotton, cellulose acetate, cellulose nitrate, viscose and similar materials. They are also useful in the emulsification of mineral oil, glycerides, fats, oils and the like. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. Some of these compounds herein described, particularly the alkylol guanidines which are disubstituted with short chain hydrocarbon radicals such as dimethyl, diethyl, dibutyl and the like, as well as the diaryl radicals, are effective anti-oxidants for oils and soaps and prevent incipient deterioration and rancidity therein.

In addition to the symmetrical disubstituted guanidines above mentioned various others may be condensed with alkylene oxides. Among such compounds, the di-alkyl guanidines include 1,3-dimethyl guanidine, 1,3-diethyl guanidine, 1,3-diamyl guanidine, 1,3-dioctyl guanidine, 1,3-didodecyl guanidine, and the like. Corresponding symmetrical disubstituted aryl guanidines such as diphenyl, di-tolyl, dixylyl, dinaphthyl and the like, and symmetrical disubstituted heterocyclic guanidines such as 1,3-dithiazyl guanidine, 1,3-dipyrimidyl guanidine, and the like, can also be reacted with alkylene oxides such as ethylene oxide, glycidol, glycosans and the like to give commercially useful condensation products.

Thus, examples of specific compounds the use of which is contemplated herein are the reaction products of 1,3-dinaphthyl guanidine and ethylene oxide or glycidol or of 1,2- or 1,3-propylene oxide and the like; or the reaction products of 1,3-diphenyl guanidine and similar alkylene oxides; or 1,3-dixylyl guanidine reacted with ethylene oxide, propylene oxide, etc., or 1,3-diquinolyl guanidine and such similar alkylene oxides.

It is to be understood that the examples given herein are merely specific embodiments of this invention and that the latter is to be broadly construed within the purview of the appended claims.

We claim:

1. As a new product, a symmetrically 1,3-disubstituted 2-ethylol guanidine wherein the substituents are aryl radicals.

2. As a new product 1,3-di-o-tolyl 2-ethylol guanidine.

WALTER P. ERICKS.
JAMES H. WILLIAMS.